Aug. 4, 1953 C. W. KEUFFEL ET AL 2,647,320
THEODOLITE
Filed Sept. 15, 1950 4 Sheets-Sheet 1
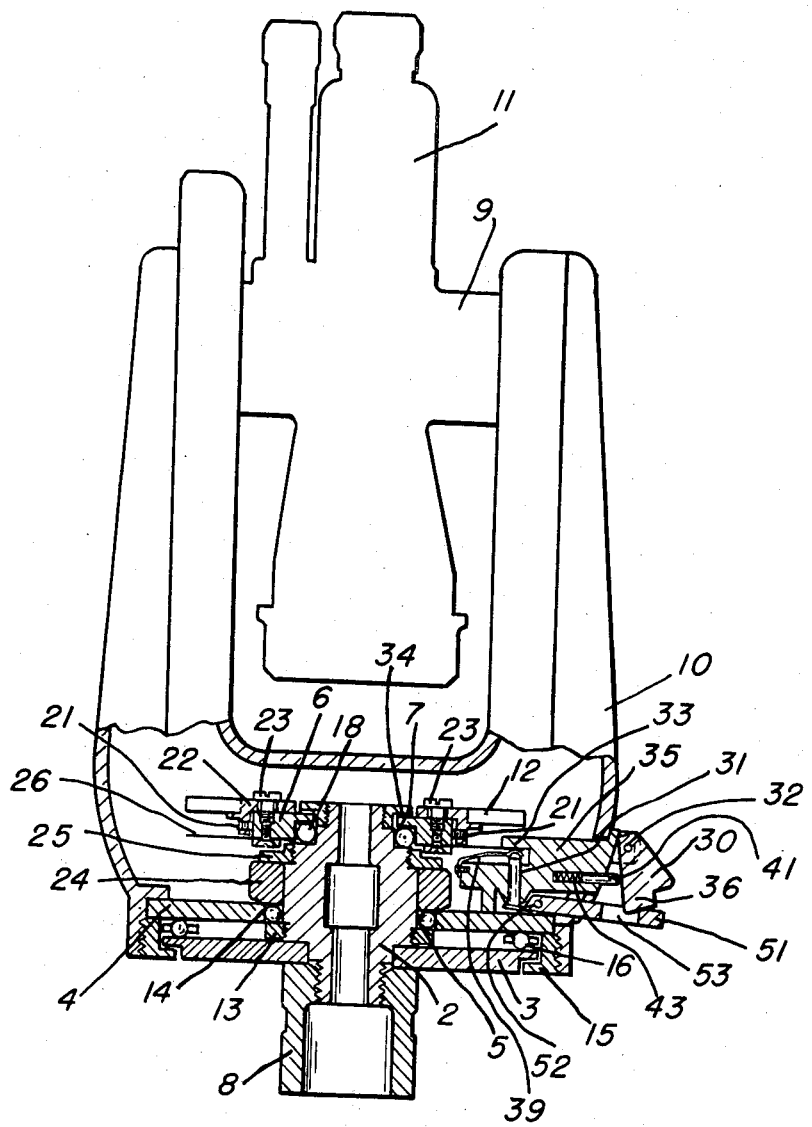
Fig. I
INVENTORS
CARL W. KEUFFEL
BY ALLISTER L. BAKER
ATTORNEY

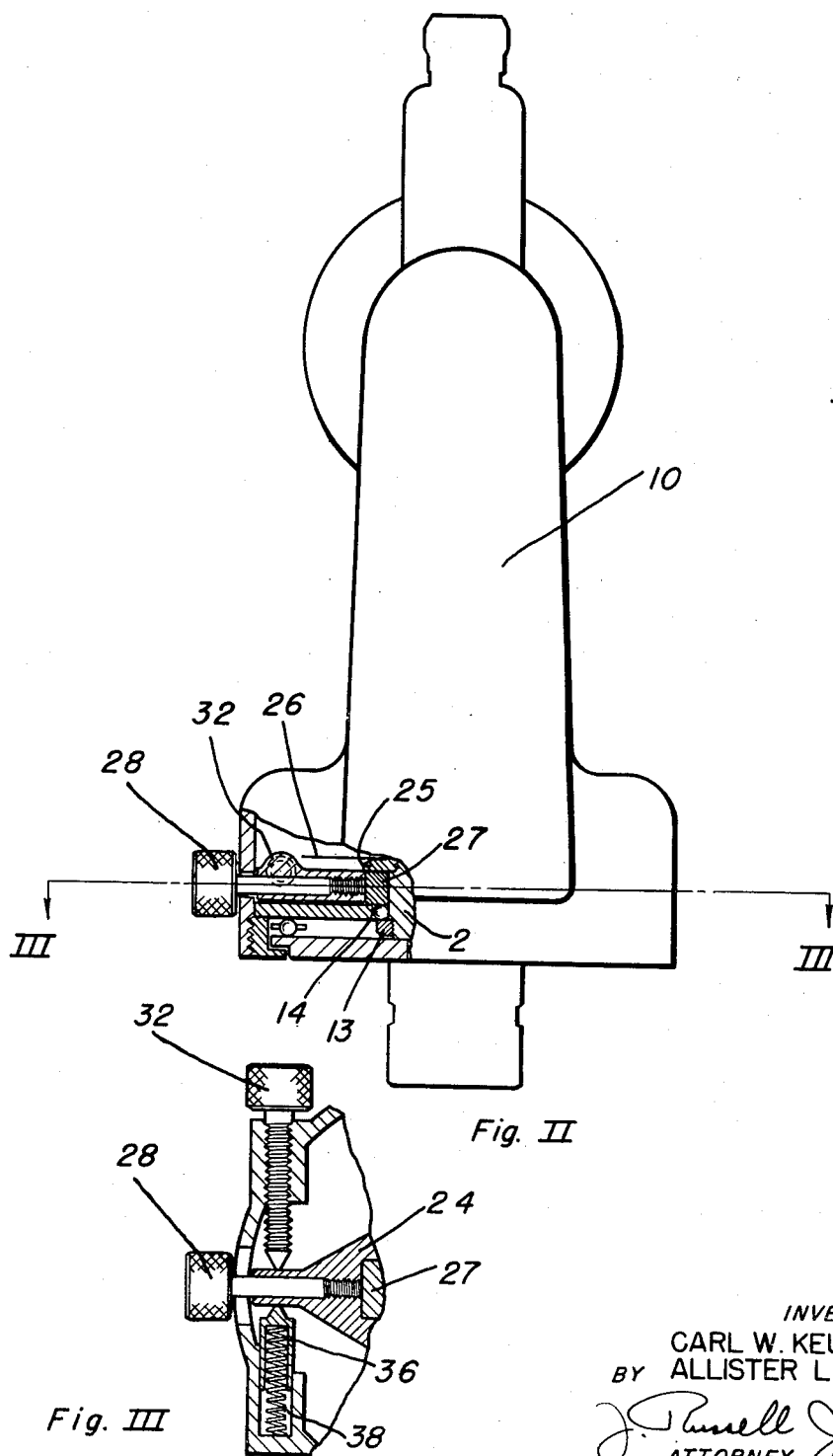

Aug. 4, 1953 C. W. KEUFFEL ET AL 2,647,320
THEODOLITE
Filed Sept. 15, 1950 4 Sheets-Sheet 3
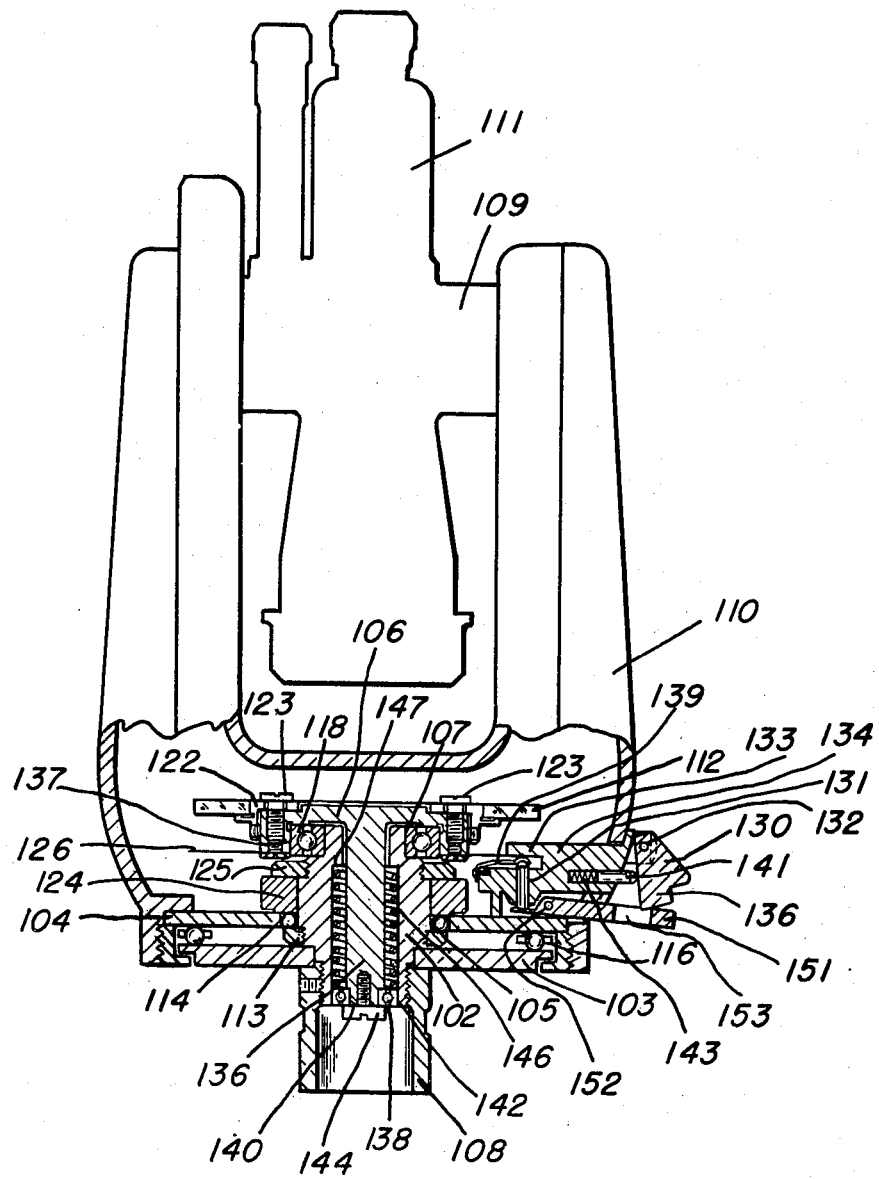
Fig. IV
INVENTORS
CARL W. KEUFFEL
BY ALLISTER L. BAKER
ATTORNEY

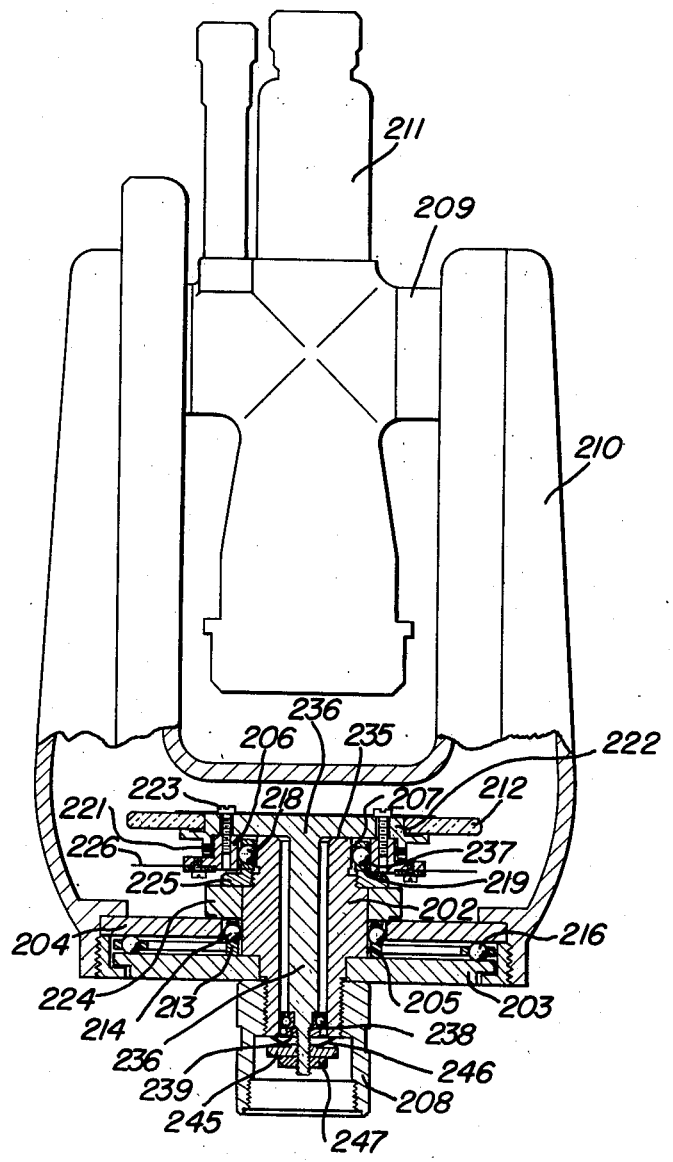
Fig. V
INVENTORS.
CARL W. KEUFFEL
ALLISTER L. BAKER

Patented Aug. 4, 1953

2,647,320

UNITED STATES PATENT OFFICE 2,647,320

THEODOLITE

Carl W. Keuffel, Bernardsville, and Allister L. Baker, Denville, N. J., assignors to Keuffel & Esser Company, Hoboken, N. J., a corporation of New Jersey Application September 15, 1950, Serial No. 185,016

15 Claims. (Cl. 33—46)

This invention relates to surveying instruments or theodolites. More specifically it relates to the center structure for surveying instruments or theodolites and is particularly useful in optical reading, glass circle theodolites. It is a continuation in part of copending application, Ser. No. 113,192, filed August 30, 1949, now abandoned.

Conventional surveying instruments are mounted on a base suitable for levelling on a tripod or the like. They have an alidade mounted so that it may be turned in azimuth with respect to the base and a divided horizontal circle which is a member graduated to read angles for measuring the position of the alidade in azimuth. The graduations or divisions on the divided circle may be produced on a dividing machine or photographically or in any other manner. The divided horizontal circle is also usually capable of being turned in azimuth in order to establish a new base line, permit repeating type observations, etc. The alidade consists of a pair of standards which support a telescope or other sighting means. The telescope is usually mounted for rotation about a horizontal axle and a vertical circle is usually provided to read the elevation of the telescope.

The system by means of which the alidade and horizontal circle are mounted for independent rotation about the base of the instrument is known as the center system of the instrument. In the conventional center system of a transit, the alidade is provided with a male center or spindle (usually tapered) which fits within a female middle center carrying the horizontal circle which in turn fits within another female center provided in the base. Clamps and tangent screws for fine adjustment are also provided.

In the conventional center system described above, it is necessary to provide coaxial inner and outer bearing surfaces on the middle female center. This invention seeks to eliminate the need for concentric inner and outer surfaces.

According to the invention the male center is joined to the base of the instrument and the other centers are mounted for rotation around it. The novel construction is particularly useful in optically read theodolites because it permits a fully enclosed horizontal circle. Balls or other rolling elements are used in the new center system so that it may rotate freely even at very low temperatures. The construction seeks to simplify the manufacture of optically read theodolites and readily permits the inclusion of the necessary clamps and fine adjustment means.

The objects of the invention are to provide a simple, precise, free turning, fully enclosable, repeating center system for use in a surveying instrument or theodolite.

These objects and the method of their attainment will be more fully understood from the following description taken in connection with the accompanying drawing in which:

Fig. I is a view in front elevation partly in section of a surveying instrument or theodolite having incorporated therein a center structure according to one embodiment of the invention.

Fig. II is a view in side elevation partly in section of the embodiment of Fig. I.

Fig. III is a view in partial sectional plan taken along line III—III of Fig. II and looking in the direction of the arrows showing the tangent screw construction.

Fig. IV is a view in front elevation partly in section of a surveying instrument or theodolite having incorporated therein a center structure according to a second embodiment of the invention.

Fig. V is a view in front elevation partly in section of a surveying instrument or theodolite having incorporated therein a center structure according to a third embodiment of the invention.

In Fig. I, the male center 2 is threadably secured to the cylindrical projection 8. The lower thrust bearing plate 3 is preferably of hardened steel and is rigidly held between the male center 2 and the cylindrical projection 8. The cylindrical projection 8 is made to fit within a detachable universal tribrach or levelling head not shown. The tribrach or levelling head may be secured to the projection 8 and in use the tribrach or levelling head is fastened on a tripod and permits the instrument to be levelled thereon. Thus the male center 2, lower thrust bearing plate 3 and cylindrical projection 8 are secured to the base of the instrument which is fixed to the tripod and levelling head during use of the instrument.

Although the instrument as shown is designed for use with a detachable levelling head or tribrach, the invention is not necessarily limited to this type of construction. The levelling head may obviously be incorporated at the base of the instrument if it is not desired that it be detachable.

The male center 2 is preferably of hardened steel and is provided with two accurately ground outer cylindrical surfaces 5 and 7 which may be parts of a continuous cylindrical surface. Both the surfaces 5 and 7 may be ground during the same set up of the male center 2 on the machine so that they will be coaxial. Instead of using two cylindrical surfaces 5 and 7 as shown, a continuous cylindrical surface extending over a substantial part of the height of the male center 2 may be used. Such a cylindrical surface may be accurately ground on high precision machinery and all parts of the surface will be coaxial to tolerances depending on the accuracy of the machinery used.

The alidade 10 of the instrument is carried by the upper thrust bearing plate 4 which also serves as a female center. The main alidade casting fits over the upper thrust bearing plate and a threaded annular ring 15 engages threads on the alidade casting to secure the upper thrust bearing plate 4 to the alidade. The annular ring 15 extends below the lower thrust bearing plate 3 and prevents dust from reaching the bearing and the horizontal circle 12. A plurality of precise balls 16 (preferably of hardened steel) separated by a spacing ring are spaced between the lower and upper thrust bearing plates 3 and 4 and support the upper thrust bearing plate 4 and the weight of the alidade 10. The alidade 10 carries a horizontal axle 9 about which the telescope 11 may be rotated.

The upper thrust bearing plate 4 is preferably of hardened steel and is provided with an accurately ground inner cylindrical surface. A row of precise balls 14 preferably of hardened steel are provided between the inner cylindrical surface of the upper thrust bearing plate 4 and the outer cylindrical surface 5 of the male center 2. The precise balls 14 are preferably of a diameter slightly larger than required to fill the space between the inner cylindrical surface of the plate 4 and the outer cylindrical surface 5 of the male center 2. Thus the balls are assembled with a slight interference (of the order of a few ten thousandths of an inch). This prevents any play in the bearing but does not interfere with the rolling of the balls.

The precise balls should be selected for sphericity and divided into groups of equal diameters. A group of balls of equal diameters can then be assembled in each instrument to give the desired interference between the outer cylindrical surface of the male center 2 and the inner cylindrical surface of the upper bearing plate 4. The tolerance in diameter permitted between different balls in any group will depend on the accuracy required of the instrument and whether or not an averaging scale reading system is used for the horizontal circle. This is a simple method adapted to the methods of quantity production on high precision grinding machinery of forming a highly accurate and free turning center bearing.

A ring 13 is secured to the male center 2 to hold the balls 14 in place between the cylindrical surfaces. Spacing means may be provided for the balls 14.

The female center 6 is mounted around the upper cylindrical surface 7 of the male center 2 or about the upper part of the cylindrical surface if a continuous cylindrical surface is provided. A row of precise balls 18 or other rolling elements such as highly precise rollers are provided between the outer cylindrical surface of the male center 2 and an accurately ground inner cylindrical surface of the female center 6. The production and assembly of this upper bearing should be carried out in a similar manner to the production and assembly of the lower bearing. The balls 18 also act as a thrust bearing between the female center 6 and the male center 2 and flat annular surfaces are provided on the female center 6 and the male center 2 for that purpose. If the male center 2 is made with a continuous outer cylindrical surface instead of the two outer cylindrical surfaces 5 and 7, the flat horizontal thrust surface for the balls 18 could be provided by means of a separate part secured to the male center 2. Spacing means may be provided for the balls 18.

The horizontal circle 12 accurately fits on the circle mount 22. Centering screws 21 are provided between the circle mount 22 and the female center 6 for centering the horizontal circle divisions about the axis of the cylindrical surface 7 which is coaxial with the cylindrical surface 5. The screws 23 are provided for locking the circle mount 22 in centered position on the female center 6. Frictional means 34 such as a spring washer may be provided between the female center 6 and the male center 2 so that the horizontal circle 12 will remain fixed with respect to the male center 2 unless a definite force is applied to the female center 6 in order to move it.

A clamp plate 26 of thin sheet material is secured to the female center 6. The pin clamp 30 carried by the alidade 10 may be operated to cause the pin 31 to contact the clamp plate 26 and bend it slightly to bring it into frictional engagement with the upper part 33 of the body 35. In this embodiment, the pin clamp is made up of a lever 30 pivoted at 32. The lever 30 is urged outwardly by a plunger 41 actuated by a spring 43. The pin 31 slides in an opening provided in the body 35 and is urged downwardly by a spring 39. A second lever 51 pivoted at 52 engages the lower end of the pin 31 at one of its ends. The other end of the lever 51 is provided with an opening 53 which can engage the lower end 36 of the lever 30.

The pin clamp 30 is shown in closed position. To open the clamp, the lever 30 is pushed in against the plunger 41 which is actuated by the spring 43. The spring 39 then pushes the pin 31 downwardly and the lever 51 is pushed upward at its outer end so that the lower part 36 of the lever 30 engages the opening 53 in the lever 51. To close the clamp 30, the lever 51 is pushed downward on its outer end so that the pin 31 is pushed upward against the clamp plate 26. The clamp plate 26 is bent slightly into frictional engagement with the upper part 33 of the body 35. The lever 30 is then urged outwardly by the plunger 41 and the lower surface of the lever 30 holds the outer end of the lever 51 down. When the pin clamp 30 is closed, the female center 6 and the horizontal circle 12 are carried with the alidade. When the pin clamp 30 is open the frictional means 34 holds the female center 6 and the circle 12 in fixed position on the male center 2.

A conventional clamp ring 24 is provided around the male center 2. The ring 25 is provided to hold the clamp ring 24 in position above the upper thrust bearing plate 4 but does not prevent rotation of the clamp ring 24 about the male center 2. The clamp knob 28 Figs. II and III is turned inward to push the slidable pad 27 into contact with the male center 2 to clamp the alidade 10 to the male center 2. A tangent screw 32 is provided for fine adjustment between the alidade and the male center 2. The tangent screw 32 acts against an extension of the clamp ring 24 and its motion is opposed by the plunger 36 actuated by the spring 38. The center core of the male center 2 is left open to eliminate unnecessary weight.

In using an instrument having the center system construction of Fig. I the clamp knob 28 and the pin clamp 30 are opened and the alidade is turned to point the telescope on the first target. The clamp knob 28 is then closed and the telescope reticle is accurately set on the target by means of the fine adjustment afforded by the tangent screw 32. A reading can then be taken of the horizontal circle corresponding to the first target.

The clamp knob 28 may then be opened and the telescope pointed at the second target again using the clamp knob 28 and the tangent screw 32 for fine adjustment. The reading of the horizontal circle now corresponds to the second target.

For repeating the reading, the pin clamp 30 is closed with the telescope still pointed on the second target. The clamp knob 28 is then opened and the telescope repointed on the first target without changing the reading of the horizontal circle.

The embodiment of Fig. IV is similar to the embodiment of Fig. I except that the row of balls 18 is replaced by a high precision commercial ball bearing 118. Commercial ball bearings have a small amount of longitudinal "play" which also permits a small amount of radial "play" due to the fact that the bearing surfaces on which the balls run are not cylindrical. This "play" is eliminated in the construction of Fig. IV.

The male center 102 is provided with accurately ground coaxial cylindrical surfaces 105 and 107 which may be parts of a single continuous cylindrical surface. The female center 106 is provided with an accurately ground internal cylindrical surface 137. The highly precise conventional ball bearing 118 is mounted between the inner cylindrical surface 137 and the outer cylindrical surface 107 so that the female center 106 and the horizontal circuit 112 will rotate about an axis coaxial with the axis of the cylindrical surface 105 about which the alidade 110 rotates.

The female center 106 is provided with a projection 136 which extends into a central opening in the male center 102. A second commercial ball bearing 138 which need not be quite as precise as the main ball bearing 118 is mounted between the lower end of the projection 136 and the lower end of the male center 102. The bearing 138 is mounted coaxial to the bearing 118 and the cylindrical surface 105. This is accomplished by grinding the surface 140 coaxial to the surface 137 and the surface 142 coaxial to the surfaces 105 and 107. The screw 144 secures the inner race of the bearing 138 to the projection 136.

A spring or other resilient means 146 is mounted under compression between the flat annular surface 147 provided on the inside of the male center 2 and the outer race of the bearing 138. The compression spring 146 acts through bearing 138, the screw 144, the projection 136 of the female center 106 to push the outer race of the bearing 118 downward with respect to the inner race. This removes the play from the precise commercial ball bearing 118.

A precise commercial ball bearing could also be used between the surface 105 of the male center 102 and the inner cylindrical surface of the upper thrust bearing plate 104. It would then be necessary to provide means to hold the outer race of the ball bearing downward or upward with respect to the inner race. This could be accomplished by the weight of the alidade.

In the embodiment of Fig. V as in the other embodiments, the male center 202 is provided with coaxial cylindrical surfaces 205 and 207 which may be parts of a single continuous surface. The female center 206 is provided with an accurately ground internal cylindrical surface 237. A row of highly precise balls 218 is provided between outer cylindrical surface 207 on male center 202 and the inner cylindrical surface of the upper female center 206.

This bearing is similar to the upper bearing of Fig. I in that the balls may be assembled with a slight interference so that there will be no need to eliminate "play" as in the embodiment of Fig. II wherein a commercial ball bearing is used. However the balls 218 are not used to support the weight of the circle as are the balls 18 in Fig. I (i. e. the balls 218 are free in the vertical direction). A ball caging means 219 is provided to space the balls 218. The means 219 may consist simply of an annular ring as shown with holes drilled radially therethrough for each ball and having a smooth lower surface which will slip easily over a smooth upper surface provided on ring 225. The top surface of caging means 219 is free and the caging means does not normally engage either of the cylindrical surfaces 207 and 237.

As in the other embodiments the horizontal circle 212 is carried by the upper female center 206 and means 221 and 223 are provided for centering the circle 212 and locking it in centered position respectively, so that the circle graduations will rotate concentrically with the cylindrical surface 207 and also with the cylindrical surface 205 about which the alidade 210 rotates.

The circle mount 222 carried by female center 206 makes frictional contact with a horizontal annular surface 235 at the top of male center 202. The female center 206 is provided with a projection 236 which extends into a central opening in the male center 202. A spring washer 246 is placed between a nut 245 threaded onto the lower end of the projection 236 and the lower end of male center 202. A locking nut 247 is also threaded onto the lower end of projection 236. By means of nut 245 an adjustable degree of compression may be applied to the spring washer 246 thereby affording a means for adjusting the friction between the circle mount 222 and the surface 235 of male center 202. Sufficient friction should be provided to hold the circle mount 222 and the circle 212 carried thereby in fixed position unless it is moved by a definite applied force (i. e. by means of the pin clamp). This friction should also be sufficient to prevent bearing back up which would otherwise be likely to occur when the circle is turned to an adjusted position and then released.

A commercial ball bearing 238 is provided between the projection 236 and the surface of the central opening in male center 202. Preferably this bearing 238 is made to slide in the central opening in male center 202. The ball bearing 238 is held on projection 236 by a nut 239 engaging the thread on the lower end of projection 236. The bearing 238 is mounted coaxially to the upper and lower main center bearings. The bearing 238 will tend to prevent tilt of the female center 206 and horizontal circle 212 about any horizontal axis.

The construction of the lower bearing about which the alidade 210 rotates may be the same as in the other embodiments of Fig. V as in the other embodiments. However a slight modification thereof is shown in Fig. V. In Fig. V, the balls 214 are free in the vertical direction except for the fact that the caging means 213 holds them in spaced position between the inside cylindrical surface of the annular plate 204 and the cylindrical surface 205. The caging means 213 is similar to the caging means 219 (i. e. it consists of an annular member having a radial opening for each ball). The caging means 213 slides on the lower annular plate 203.

A pin clamp having the same construction as shown in Figs. I and IV is also provided although not shown in Fig. V and a clamp and tangent screw as shown in Fig. II and Fig. III is also provided in this embodiment and the embodiment of Fig. IV.

The combination of parts shown and described in connection with the various embodiments make up a center system for a surveying instrument or theodolite which is simple, free turning, easy to seal against dust and adapted to the methods of quantity production.

Having thus described the invention, what is claimed is:

1. A center system for a surveying instrument having a base, an alidade and a divided circle, comprising a male center secured to the base of the instrument, coaxial upper and lower external cylindrical surfaces on said male center, means comprising a plurality of rolling elements mounting said alidade for rotation about said lower external cylindrical surface and means comprising a plurality of rolling elements mounting said divided circle for rotation about said upper external cylindrical surface.

2. A center system for a surveying instrument having a base, an alidade and a divided circle, comprising a male center secured to the base of the instrument, coaxial upper and lower external cylindrical surfaces on said male center, a female center supporting the alidade having an inner cylindrical surface, a plurality of rolling elements engaging the lower external cylindrical surface on said male center and the inner cylindrical surface on said female center with a slight interference which permits rotation of said female center and the alidade about said male center and the base of the instrument, a second female center carrying the divided circle having an inner cylindrical surface and a plurality of rolling elements engaging the upper external cylindrical surface on said male center and the inner cylindrical surface on said second female center with a slight interference which permits rotation of said second female center and the divided circle about said male center and the base of the instrument.

3. A center system for a surveying instrument having a base, an alidade and a divided circle, comprising a male center secured to the base of the instrument, coaxial external cylindrical surfaces on said male center, an annular member having a flat upper surface secured to the base of the instrument, a female center made up by a second annular member above said first annular member having a flat lower surface and a cylindrical inner surface, said second annular member supporting the alidade of the surveying instrument, a plurality of precise balls engaging the upper flat surface of said first annular member and the lower flat surface of said second annular member, a plurality of precise balls engaging one of the external cylindrical surfaces on said male center and the inner cylindrical surface of said second annular member, said precise balls permitting rotation of said second annular member and the alidade about said male center and the base of the surveying instrument, a second female center carrying the divided circle having an inner cylindrical surface and means comprising a plurality of rolling elements mounting said second female center and the divided circle for rotation about the other external cylindrical surface of said male center and the base of the instrument.

4. A center system for a surveying instrument having a base, an alidade and a divided circle, comprising a male center secured to the base of the instrument, coaxial external cylindrical surfaces on said male center, an annular member having a flat upper surface secured to the base of the instrument, a female center made up by a second annular member having a flat lower surface and a cylindrical inner surface, said second annular member supporting the alidade of the surveying instrument, a plurality of precise balls engaging the upper flat surface of said first annular member and the lower flat surface of said second annular member, a plurality of precise balls engaging one of the external cylindrical surfaces on said male center and the inner cylindrical surface of said second annular member, said precise balls permitting rotation of said second annular member and the alidade about said male center and the base of the surveying instrument, a second female center carrying the divided circle having an inner cylindrical surface, a plurality of rolling elements engaging the other of the external cylindrical surfaces on said male center and the inner cylindrical surface on said second female center to permit rotation of said second female center and the divided circle about said male center and the base of the instrument, a clamp acting between the alidade and said male center, fine adjustment means acting between the alidade and said male center and a clamp acting between said alidade and said second female center.

5. A center system for a surveying instrument having a base, an alidade and a divided circle, comprising a male center secured to the base of the instrument, coaxial upper and lower external cylindrical surfaces on said male center, a female center supporting the alidade having an inner cylindrical surface, a plurality of rolling elements engaging the lower external cylindrical surface on said male center and the inner cylindrical surface on said female center to permit rotation of said female center and the alidade about said male center and the base of the instrument, a second female center carrying the divided circle having an inner cylindrical surface, a plurality of rolling elements engaging the upper external cylindrical surface on said male center and the inner cylindrical surface on said second female center to permit rotation of said second female center and the divided circle about said male center and the base of the instrument, a clamp acting between the alidade and said male center, fine adjustment means acting between the alidade and said male center and a clamp acting between said alidade and said second female center.

6. A center system for a surveying instrument having a base, an alidade and a divided circle, comprising a male center secured to the base of the instrument, upper and lower external cylindrical surfaces on said male center, a female center supporting the alidade having an inner cylindrical surface of larger diameter than the lower cylindrical surface on said male center, a second female center carrying the divided circle having an inner cylindrical surface of larger diameter than the upper cylindrical surface on said male center, a plurality of rolling elements between the lower cylindrical surface on said male center and the inner cylindrical surface on said female center supporting the alidade and a plurality of rolling elements between the upper cylindrical surface on said male center and the inner cylindrical surface on said second female center to permit coaxial rotation of said female centers about said male center.

7. A center system for a surveying instrument having a base, an alidade and a divided circle comprising a male center having a central opening secured to the base of the instrument, two coaxial external cylindrical surfaces on said male center, means comprising a plurality of rolling elements mounting the alidade for rotation about one of said coaxial cylindrical surfaces on said male center, a female center carrying the divided circle having an inner cylindrical surface, a projection carried by said female center extending within the central opening of said male center, an anti-friction bearing between the other of said coaxial external cylindrical surfaces on said male center and the inner cylindrical surface of said female center, a second anti-friction bearing in the central opening of said male center between the male center and said projection carried by said female center, said antifriction bearings permitting rotation of said female center and the divided circle about said male center and the base of the surveying instrument and resilient means within the central opening in said male center acting between said male center and said projection on said female center to remove play from said antifriction bearings.

8. A center system for a surveying instrument having a base, an alidade and a divided circle, comprising a male center secured to the base of the instrument, said male center being provided with a central opening, coaxial external cylindrical surfaces on said male center, an annular member having a flat upper surface secured to the base of the instrument, a female center made up by a second annular member above said first annular member having a flat lower surface and a cylindrical inner surface, said second annular member supporting the alidade of the surveying instrument, a plurality of precise balls engaging the upper flat surface of said first annular member and the lower flat surface of said second annular member, a plurality of precise balls engaging one of the external cylindrical surfaces on said male center and the inner cylindrical surface of said second annular member, said precise balls permitting rotation of said second annular member and the alidade about said male center and the base of the surveying instrument, a second female center carrying the divided circle having an inner cylindrical surface, a projection carried by said second female center extending within the central opening of said male center, an antifriction bearing between the other of said concentric external cylindrical surfaces on said male center and the inner cylindrical surface of said female center, a second antifriction bearing in the central opening of said male center between the male center and said projection carried by said female center, said antifriction bearings permitting rotation of said female center and the divided circle about said male center and the base of the surveying instrument and resilient means within the central opening in said male center acting between said male center and said projection on said female center to remove play from said antifriction bearings.

9. A center system for a surveying instrument having a base, an alidade and a divided circle, comprising a male center secured to the base of the instrument, said male center being provided with a central opening coaxial external cylindrical surfaces on said male center, an annular member having a flat upper surface secured to the base of the instrument, a female center made up by a second annular member above said first annular member having a flat lower surface and a cylindrical inner surface, said second annular member supporting the alidade of the surveying instrument, a plurality of precise balls engaging the upper flat surface of said first annular member and the lower flat surface of said second annular member, a plurality of precise balls engaging one of the external cylindrical surfaces on said male center and the inner cylindrical surface of said second annular member, said precise balls permitting rotation of said second annular member and the alidade about said male center and the base of the surveying instrument, a second female center carrying the divided circle having an inner cylindrical surface, a projection carried by said second female center extending within the central opening of said male center, an antifriction bearing between the other of said coaxial external cylindrical surfaces on said male center and the inner cylindrical surface of said female center, a second antifriction bearing in the central opening of said male center between the male center and said projection on said female center, said antifriction bearings permitting rotation of said female center and the divided circle about said male center and the base of the surveying instrument, resilient means within the central opening in said male center acting between said male center and said projection carried by said female center to remove play from said antifriction bearings, a clamp acting between the alidade and said male center, fine adjustment means acting between the alidade and said male center, and a clamp acting between said alidade and said second female center.

10. A center system for a surveying instrument having a base, an alidade and a divided circle comprising a male center having a central opening secured to the base of the instrument, coaxial external cylindrical surfaces on said male center, means comprising a plurality of rolling elements mounting the alidade for rotation about one of said coaxial cylindrical surfaces on said male center, a female center carrying the divided circle having an inner cylindrical surface, a projection carried by said female center extending within the central opening of said male center, a plurality of rolling elements between the other of said coaxial cylindrical surfaces on said male center and the inner cylindrical surface of said female center permitting rotation of said female center and the divided circle about said male center and the base of the surveying instrument and resilient means acting between said male center and said projection on said female center to provide friction between said female center and the upper end of said male center.

11. A center system for a surveying instrument having a base, an alidade and a divided circle comprising a male center secured to the base of the instrument, coaxial external cylindrical surfaces on said male center, means comprising a plurality of rolling elements mounting the alidade for rotation about one of said coaxial cylindrical surfaces on said male center, a female center carrying the divided circle having an inner cylindrical surface, a plurality of rolling elements between the other of said coaxial cylindrical surfaces on said male center and the inner cylindrical surface of said female center permitting rotation of said female center and the divided circle about said male center and the base of the surveying instrument, said rolling elements being substantially free in the vertical direction and an upper flat horizontal surface at the top of said male center supporting the weight of said divided circle.

12. A center system for a surveying instrument having a base, an alidade and a divided circle comprising a male center having a central opening secured to the base of the instrument, coaxial cylindrical surfaces on said male center, means comprising a plurality of rolling elements mounting the alidade for rotation about one of said coaxial cylindrical surfaces on said male center, a female center carrying the divided circle having an inner cylindrical surface, a plurality of rolling elements between the other of said coaxial cylindrical surfaces on said male center and the inner cylindrical surface of said female center permitting rotation of said female center and the divided circle about said male center and the base of the surveying instrument, said rolling elements being substantially free in the vertical direction, an upper flat horizontal surface at the top of said male center supporting the weight of said divided circle, a projection carried by said female center extending within the central opening of said male center and resilient means acting between said male center and said projection on said female center to increase the friction on the upper flat horizontal surface at the top of said male center.

13. A center system for a surveying instrument having a base, an alidade and a divided circle comprising a male center having a central opening secured to the base of the instrument, coaxial cylindrical surfaces on said male center, means comprising a plurality of rolling elements mounting the alidade for rotation about one of said coaxial cylindrical surfaces on said male center, a female center carrying the divided circle having an inner cylindrical surface, a plurality of rolling elements between the other of said coaxial cylindrical surfaces on said male center and the inner cylindrical surface of said female center permitting rotation of said female center and the divided circle about said male center and the base of the surveying instrument, said rolling elements being substantially free in the vertical direction, an upper flat horizontal surface at the top of said male center supporting the weight of said divided circle, a projection carried by said female center extending within the central opening of said male center, a ball bearing in the central opening of said male center between the lower end of said projection and said male center and resilient means acting between said male center and said projection on said female center to increase the friction on the upper flat horizontal surface at the top of said male center.

14. A center system for a surveying instrument having a base, an alidade and a divided circle, comprising a male center secured to the base of the instrument, said male center being provided with a central opening, coaxial external cylindrical surfaces on said male center, an annular member having a flat upper surface secured to the base of the instrument, a female center made up by a second annular member above said first annular member having a flat lower surface and a cylindrical inner surface, said second annular member supporting the alidade of the surveying instrument, a plurality of precise balls engaging the upper flat surface of said first annular member and the lower flat surface of said second annular member, a plurality of precise balls engaging one of the external cylindrical surfaces on said male center and the inner cylindrical surface of said second annular member, said precise balls permitting rotation of said second annular member and the alidade about said male center and the base of the surveying instrument, a second female center carrying the divided circle having an inner cylindrical surface, a plurality of rolling elements between the other of said coaxial cylindrical surfaces on said male center and the inner cylindrical surface of said second female center permitting rotation of said second female center and the divided circle about said male center and the base of the surveying instrument, said rolling elements being substantially free in the vertical direction, an upper flat horizontal surface at the top of said male center supporting the weight of said divided circle, a projection carried by said female center extending within the central opening of said male center, a ball bearing in the central opening of said male center between the lower end of said projection and said male center and resilient means acting between said male center and said projection on said female center to increase the friction on the upper flat horizontal surface at the top of said male center.

15. A center system for a surveying instrument having a base, an alidade and a divided circle comprising a male center having a central opening secured to the base of the instrument, coaxial cylindrical surfaces on said male center, means comprising a plurality of rolling elements mounting the alidade for rotation about one of said coaxial cylindrical surfaces on said male center, a female center carrying the divided circle having an inner cylindrical surface, a plurality of rolling elements between the other of said coaxial cylindrical surfaces on said male center and the inner cylindrical surface of said female center permitting rotation of said female center and the divided circle about said male center and the base of the surveying instrument, said rolling elements being substantially free in the vertical direction, an upper flat horizontal surface at the top of said male center supporting the weight of said divided circle, a projection carried by said female center extending within the central opening of said male center, a ball bearing in the central opening of said male center between the lower end of said projection and said male center, resilient means acting between said male center and said projection on said female center to increase the friction on the upper flat horizontal surface at the top of said male center, fine adjustment means acting between the alidade and said male center and a clamp acting between said alidade and said second female center.

CARL W. KEUFFEL.
ALLISTER L. BAKER.

References Cited in the file of this patent

UNITED STATES PATENTS

| Number | Name | Date |
|---|---|---|
| 918,190 | Von Nagy | Apr. 13, 1909 |
| 1,777,853 | Mahler | Oct. 7, 1930 |
| 2,153,109 | Veeder | Apr. 4, 1939 |
| 2,164,051 | Brunson | June 27, 1939 |
| 2,280,057 | Brunson | Apr. 21, 1942 |
| 2,329,978 | Brunson | Sept. 21, 1943 |
| 2,431,290 | Wilderman | Nov. 18, 1947 |
| 2,531,252 | Brunson | Nov. 21, 1950 |

FOREIGN PATENTS

| Number | Country | Date |
|---|---|---|
| 343,485 | Germany | Nov. 2, 1921 |
| 413,402 | Germany | May 9, 1925 |
| 548,512 | Great Britain | Oct. 13, 1942 |
| 548,513 | Great Britain | Oct. 13, 1942 |

OTHER REFERENCES

Book entitled "Handbook on Ball and Roller Bearings," by A. W. Macaulay, 1924, pages 42-43.